UNITED STATES PATENT OFFICE.

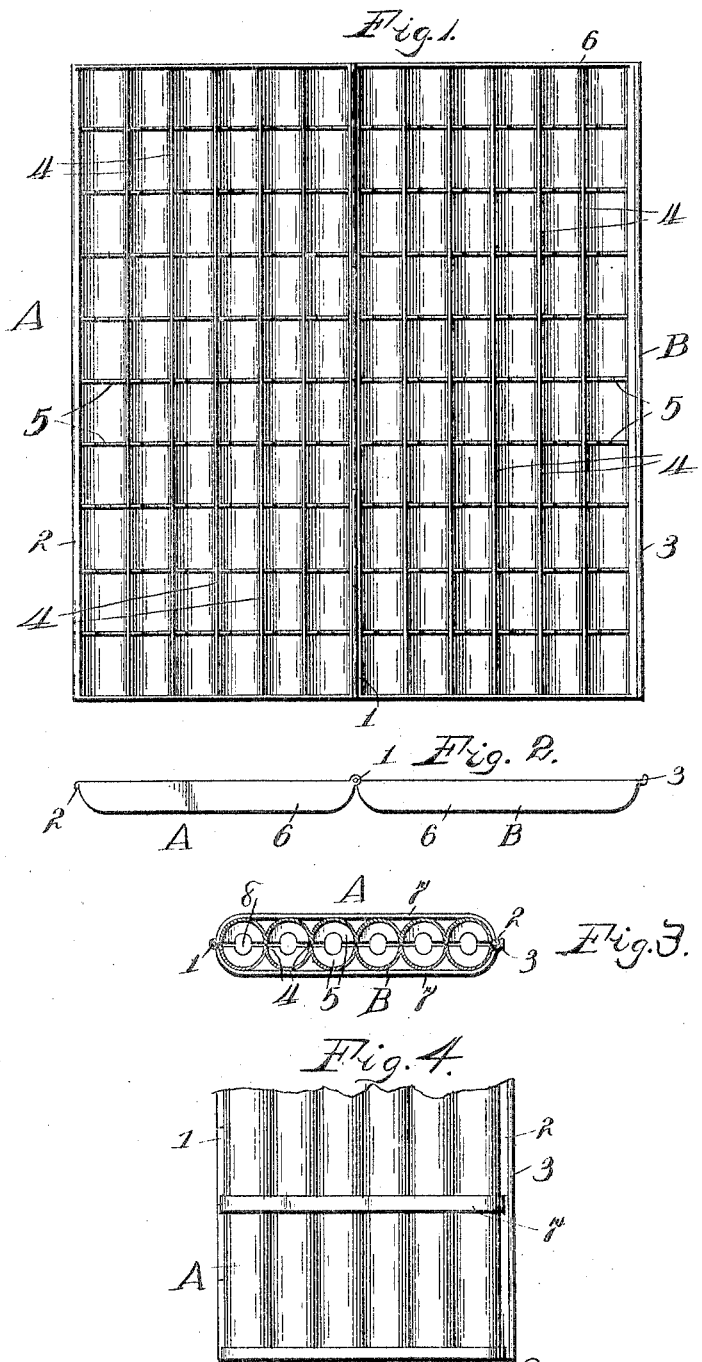

JOHN D. KINZER, OF INDIANAPOLIS, INDIANA

ICE-CREAM MOLD.

No. 802,455.  Specification of Letters Patent.  Patented Oct. 24, 1905.

Application filed May 17, 1905. Serial No. 260,818.

*To all whom it may concern:*

Be it known that I, JOHN D. KINZER, a citizen of the United States, residing at Indianapolis, in the county of Marion and State of Indiana, have invented certain new and useful Improvements in Ice-Cream Molds, of which the following is a specification.

My invention relates to an improvement in ice-cream molds, the object being to provide a sectional mold, the sections being hinge-connected and when in open position adapted to receive cream of the same kind or of different kinds, flavors, or colors, as preferred. The sections after being filled are folded together, so that the molds register with each other, and the contents of the molds are brought together preparatory to being further congealed or removed for consumption.

To this end my invention consists in certain novel features of construction and combinations of parts, such as will be more fully described hereinafter and particularly set forth in the claims.

In the accompanying drawings, Figure 1 is a plan view of my invention in opened position. Fig. 2 is an end view thereof. Fig. 3 is a cross-sectional view through the mold when in closed position, and Fig. 4 is a fragmentary view in plan of the mold in its closed position.

A and B indicate the two sections of my improved mold, the adjacent edges of the sections being hinged together, as at 1 1, to permit the sections to be opened away from each other or closed together. The opposite or free edges of the sections are provided with flanges 2 and 3, one of which may overlap the other, as shown.

Each mold-section comprises a plurality of series of semicylindrical forms extending longitudinally of the sections, the adjacent edges of the forms meeting in the ridges 4 4, and these forms are each divided at suitable intervals by the partitions 5 5, which are themselves semicircular, whereby when the mold-sections are closed a restricted opening 8 is formed between the adjacent divisions of each form. When closed, the divisions in one section register with those in the opposing section. It will be understood that the opposite ends of the series of forms in each section are closed by the end pieces 6 6 of the mold. The outer face of each section presents a scalloped appearance, and in order to strengthen the mold, I provide the laterally-extending straps 7 7, as shown.

In employing my invention the molds are placed in open position beneath a hopper or other means whereby the sections may be filled. The mold is then removed and closed or folded, whereby the mold-divisions register with each other, and the material in the registering individual molds will stick or cling together, forming a cylinder in the present instance. It will be obvious, however, that the shape of the molds may vary to suit the individual desire. After the mold has been closed it may be subjected to a refrigerant, or the contents may be removed subsequently for consumption.

From the foregoing it will be seen that I have invented a mold of simple construction, inexpensive and easily handled, whereby the cream may be prepared in fanciful and dainty shapes, colors, and flavors. It is also evident that slight changes might be made in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. A mold comprising a pair of sections, each section, comprising a series of parallel longitudinally-extending grooves, the adjacent edges of the grooves forming ridges which separate the grooves, and a series of division-plates located in each corrugation.

2. A mold comprising a pair of sections hinged together, each section comprising a series of parallel longitudinally-extending semicylindrical grooves, the adjacent edges of the grooves forming ridges for separating the grooves, and a series of division-plates located in each corrugation.

3. A mold comprising a pair of sections hinged together, each section comprising a series of parallel longitudinally-extending semicylindrical grooves, the adjacent edges of the grooves forming ridges for separating the grooves, and a series of division-plates located in each corrugation, the division-plates each being constructed in the arc of a circle to leave a restricted opening between and connecting adjacent divisions.

4. A mold comprising a plurality of sections, means pivotally connecting the sections, each section consisting of a plurality of corrugated members secured together at their adjacent edges, division-plates located in each corrugation and an end plate for closing the opposite ends of the series of corrugated members.

In testimony whereof I affix my signature in presence of two witnesses.

JOHN D. KINZER.

Witnesses:
 L. E. SNOW,
 J. H. SNOW.